(12) United States Patent
Hsieh

(10) Patent No.: US 6,283,272 B1
(45) Date of Patent: Sep. 4, 2001

(54) AUTOMATIC TUBE ORIENTATION APPARATUS

(75) Inventor: T. D. Hsieh, Yung Ho (TW)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/461,527

(22) Filed: Dec. 14, 1999

Related U.S. Application Data

(60) Provisional application No. 60/112,122, filed on Dec. 14, 1998.

(51) Int. Cl.$^7$ .................................................. B65G 47/24
(52) U.S. Cl. ........................................ 198/394; 198/397.06
(58) Field of Search ............................... 198/394, 396, 198/399, 397.06, 383, 414

(56) References Cited

U.S. PATENT DOCUMENTS

| | | | |
|---|---|---|---|
| 2,609,912 | * 9/1952 | Engel | 198/397.06 |
| 3,863,757 | * 2/1975 | Kinney | 198/397.06 X |
| 4,498,574 | * 2/1985 | Fischer | 198/394 X |
| 4,629,387 | * 12/1986 | Stillman et al. | 198/394 X |
| 4,735,343 | * 4/1988 | Herzog | 198/397.06 X |

* cited by examiner

*Primary Examiner*—James R. Bidwell
(74) *Attorney, Agent, or Firm*—Wade James Brady, III; Frederick J. Telecky, Jr.

(57) ABSTRACT

An orientation apparatus (10) includes a pair of conveyor chains (21a,21b) with pins (22) on alternate links for moving a component tube (40) to a lift station (26,27) where the component tube (40) is rotated until it is in a desired orientation. The component tube (40) is rotated by rollers (30,33) until an index tab (28a) falls into an opening (40a) in the component tube (40), stopping its rotation. The component tube (40) is then lowered onto the conveyor chains (21a,21b) and moved to the end of the apparatus where is it removed from the orientation apparatus. A component tube chamber (50) located above the conveyor chains drops one component tube (40) at a time, utilizing two singulators (58,59), onto the conveyor chains (21a,21b).

12 Claims, 6 Drawing Sheets

AUTOMATIC TUBE ORIENTATION APPARATUS

This application claims priority under 35 USC §119(e)(1) of provisional application No. 60/112,122 filed Dec. 14, 1998.

FIELD OF THE INVENTION

The invention an apparatus for handling component tubes, and more particularly to an apparatus for receiving component tubes and outputting them in a uniform orientation.

BACKGROUND OF THE INVENTION

Semiconductor devices, including integrated circuits are stored in plastic component tubes to protect the devices, and particularly the leads to prevent damage such as bending and breaking. The tubes have been simple tubes in which the devices are inserted, and then a plug inserted into the end of the tube. More recent storage tubes have a platform extending through the center of the tube on which the body of the device is supported with the conductor leads on each side of the device separated by the platform. Each end of the tube has a resilient plug that is inserted into the tube to prevent the devices from falling out of the tube. In another embodiment, a pin is inserted in an opening in the end of the tube. The pin extends through the tube and prevents the devices from falling out of the tube. Examples of component tubes are shown in U.S. Pat. Nos. 5,417,842 and 5,569,149. An example of a pin extractor for component tubes is found in U.S. Pat. No. 5,594,985.

In the manufacturing of circuit board assemblies, the placement of the circuit components is automated in that a component is fed from a tube feeder holding the components. A component feeder removes the components from a tube, one at a time, and moves them to a pick station where the component is moved by a picker device to the circuit board on which the component is to be mounted. Only one type of component can be handled by the component feeder at a time. To feed a different type of component, another type or size of tube feeder must be used.

In the loading component tubes, it is necessary that the tubes be in the correct orientation for the components to be loaded in to the component tube. After the tubes are loaded, the tubes must be properly oriented to unload the components from the tubes, and in the case where the component tubes are used in pick-feeders where the components are moved out of the tubes to a pick point the components must be in the proper orientation so that the components can be placed on a printed wiring board. Where the components tubes are automatically placed in the pick-feeder, the tubes have to be properly oriented so that the components tubes can dispense the components in a correct orientation.

SUMMARY OF THE INVENTION

The orientation apparatus includes a pair of conveyor chains with pins on alternate links for moving a component tube to a lift station where the component tube is rotated until it is in a desired orientation. The component tube is rotated by rollers until an index tab falls into an opening in the component tube, stopping its rotation. The component tube is then lowered onto the conveyor chains and moved to the end of the apparatus where is it removed from the orientation apparatus. A component tube chamber located above the conveyor chains drops one component tube at a time, utilizing two singulators, onto the conveyor chains.

DESCRIPTION OF A PREFERRED EMBODIMENT

Figure 1:
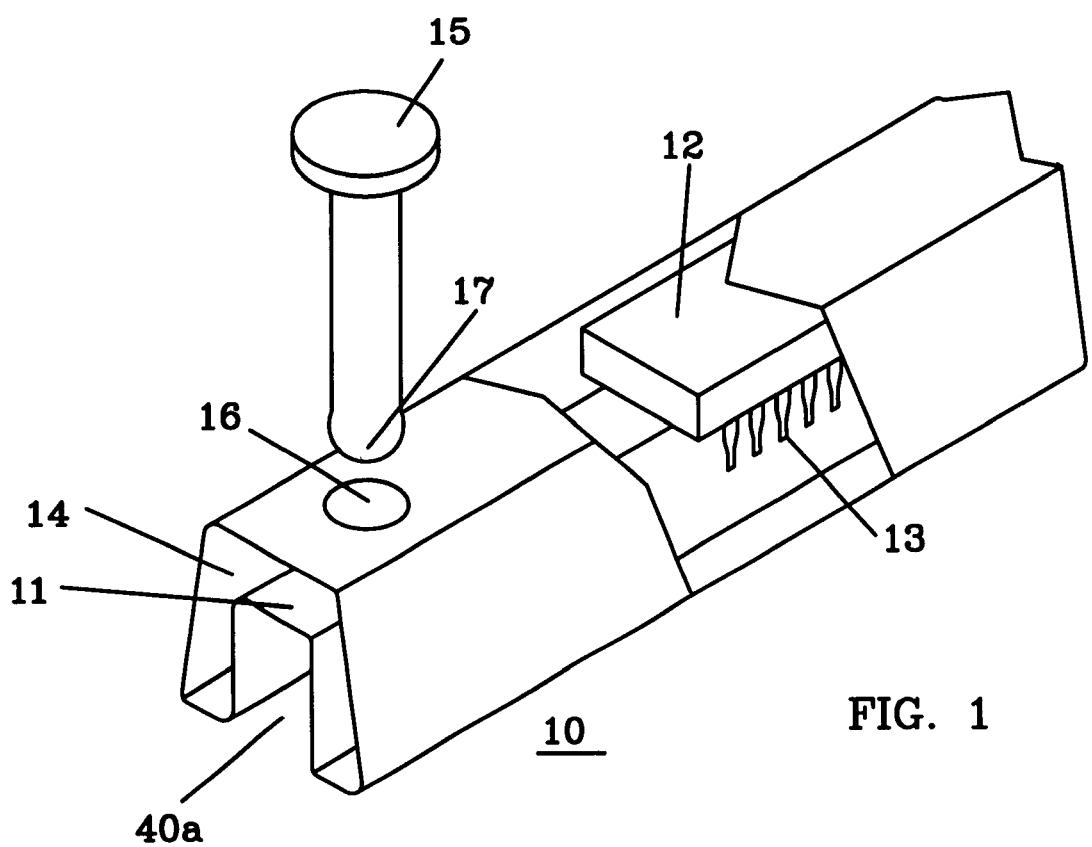
FIG. 1 shows a partial view of a component tube.

FIG. 1 shows a component tube or magazine 10 that utilizes a pin-lock to hold semiconductor devices in the magazine. Magazine 10 has a platform 11 on which devices 12 are placed through opening 14 in the end of the magazine, with the device pins 13 on each side of platform 11. A pin 15 in each end of the magazine (only one end of magazine 10 is shown) prevents the semiconductor devices from sliding out of the magazine. Pin 15 is inserted into hole 16 and is secured in hole 16 by enlarged pin end 17, which is slightly larger than hole 16. Because the plastic from which the magazine 10 is made is resilient, the enlarged end 17 may be forced through hole 16, and then pulled out when the devices are to be removed from the magazine. Slot 40a extends the length of component tube 10.

Component tube 10 holds various types of semiconductor devices, but tube 10 has to be in a proper position for semiconductor devices to be loaded into or removed.

Figure 2:
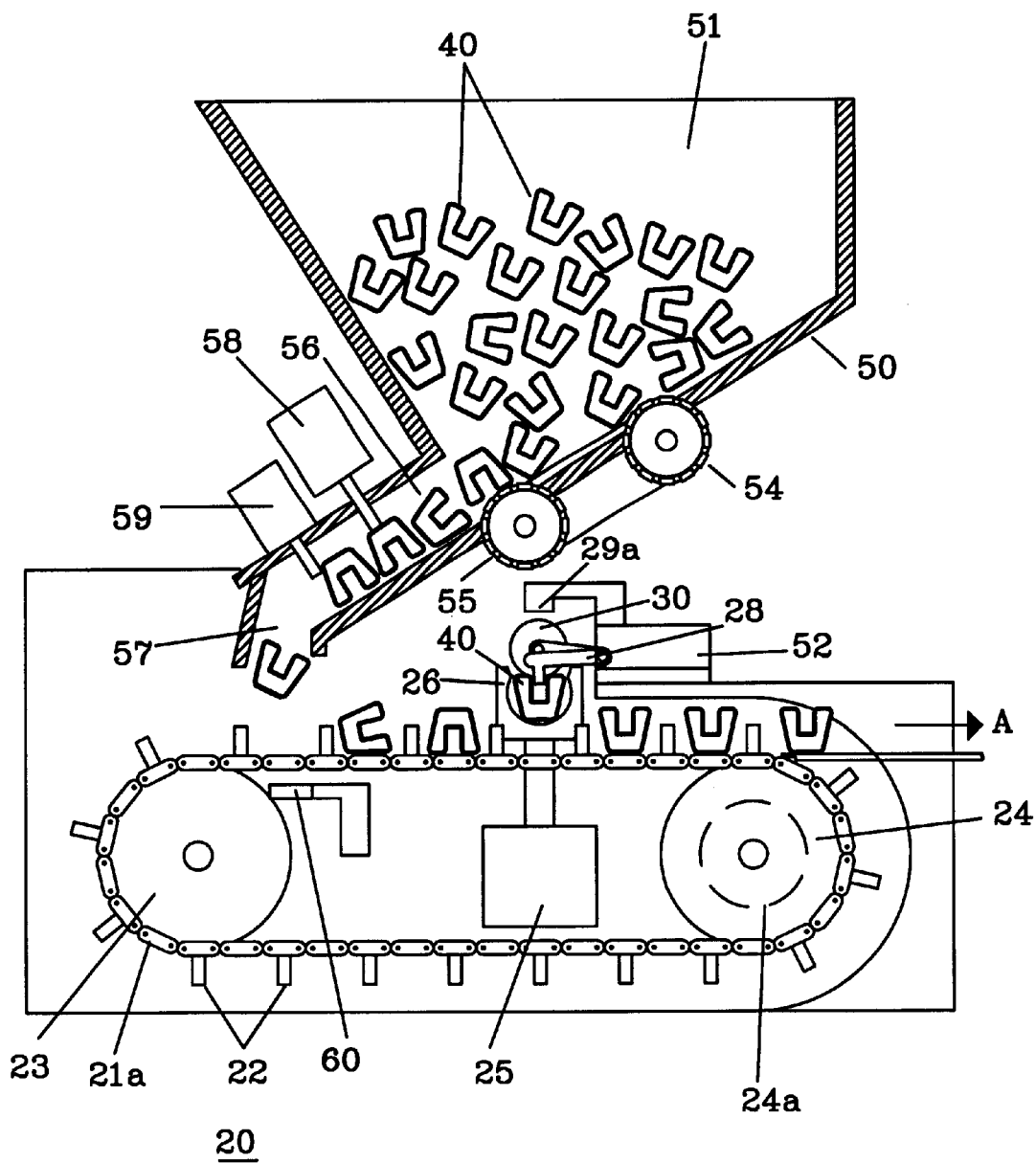
FIG. 2 shows a first embodiment of the invention.

FIG. 2 shows an apparatus used in receiving and orientating component tubes to place them in position for loading and loading of components. Apparatus 20 includes a pair of conveyor chains 21a and 21b (FIG. 5) that move a component tube 40 to a lift station where the component tube 40 is rotated until it is in a desired position. Conveyor chain 21a is moved around wheels 23 and 24 by motor 24a (shown by dashed line 24a). Conveyor 21b chain is moved around a similar pair of wheels which are not illustrated. Each chain has a plurality of vertical pins 22 on every other chain link. The spacing between pins 22 is sufficient to allow a component tube 40 to be placed between a pair of the pins.

Positioned above conveyor chains 21a and 21b is tube dispensing apparatus 50 that has a chamber 51 for holding a plurality of component tubes 40. Agitator rollers 54 and 55 help to move the component tubes into channel 56 where there are two singulators 58 and 59 which prevent more than one component tube 40 from being released onto the conveyor chains at a time. Singulator 59 releases a component tube when there is no component tube on the conveyor chains 21a and 21b as sensed by sensor 60. The component tubes fall through opening 57 onto the conveyor chains between pins 22. Since the component tubes do not always fall in the same position, it is necessary to rotate the tubes to a common position. After a component tube is deposited onto the conveyor chains 21a and 21b, and sensed by sensor 60, it is moved in sequence with previously dropped tubes to a lift station made up of lifters 26 and 27 (FIG. 4) and lift elevator 25. Elevator 25 may be either electrically or hydraulically actuated to move lifters 26 and 27 upward, moving component tube 40 upward. Component tube 40 is engaged by rollers 30 and 33 (FIG. 4) and index arm 28. A sensor 29a senses when a component tube is in lifters 26 and 27 and starts a motor 52 turning rollers 30 and 33, rotating the component tube until index tab 28a on indexer 28 falls into a slot 40a in component tube (see FIG. 1) and prevents it from being further rotated. The component tube is lowered back onto the conveyor chains and removed from apparatus 20, as indicated by arrow A, to another conveyor or pick up device (not illustrated).

Figure 3:
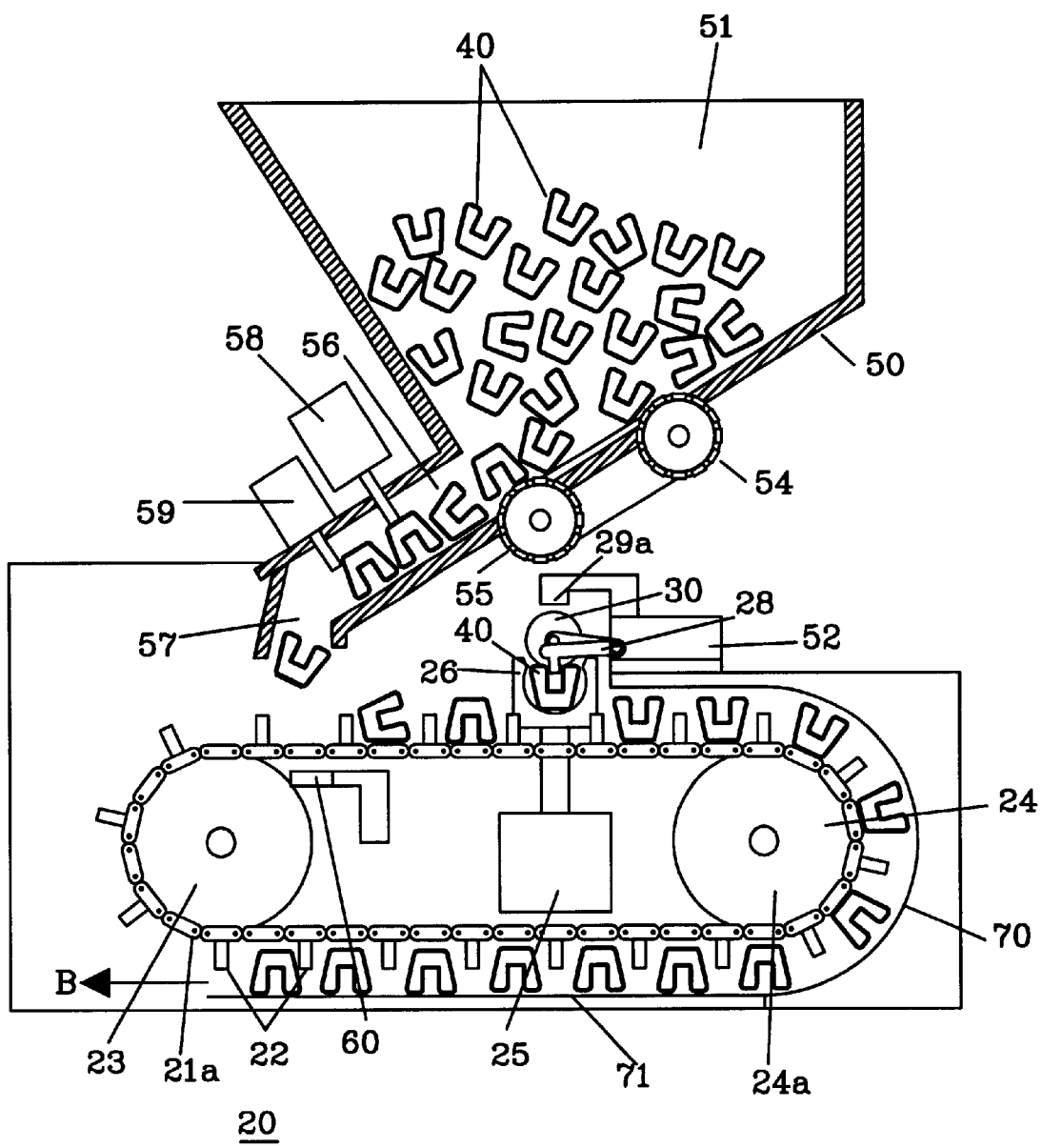
FIG. 3 shows a second embodiment of the invention.

FIG. 3 is another embodiment of apparatus 10 in which a component tube is not removed from conveyor chains 21a and 21b as indicated by arrow A, but is moved around through guide 70 and along support 71 by pins 22 until the component tube is moved from apparatus 10 at arrow B. This will place the component tube in an upside down position as compared to the position of component tube when it is removed at arrow A.

Figure 4:
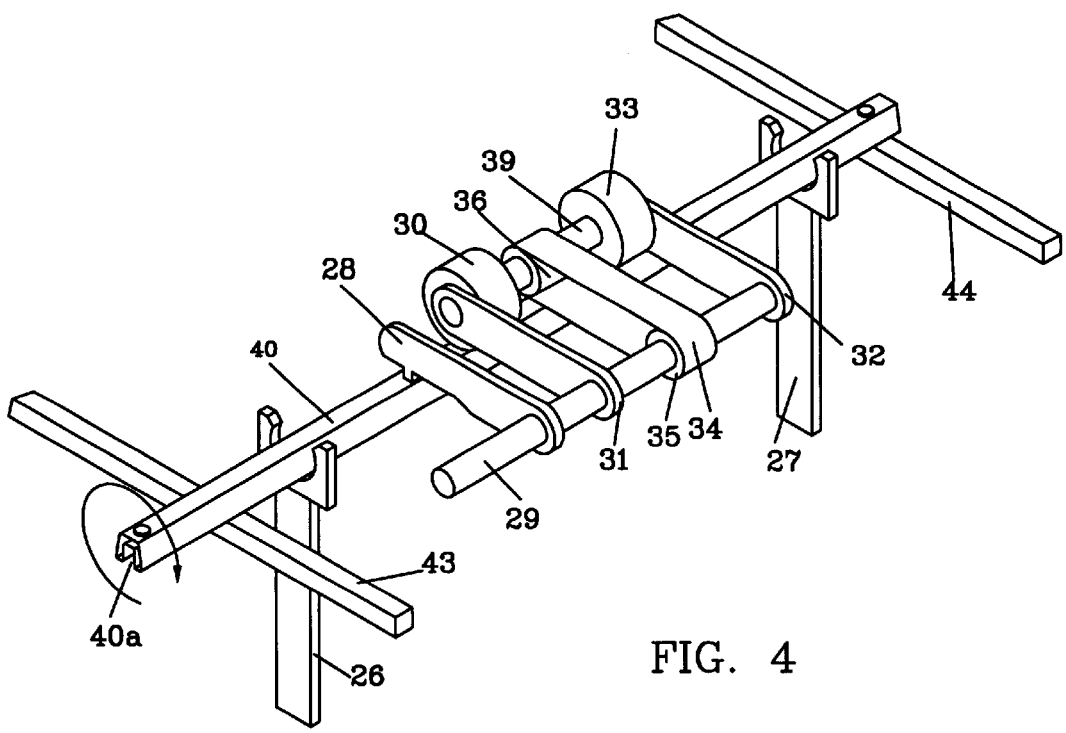
FIG. 4 shows a partial view of the orientation mechanism.
Figure 5:
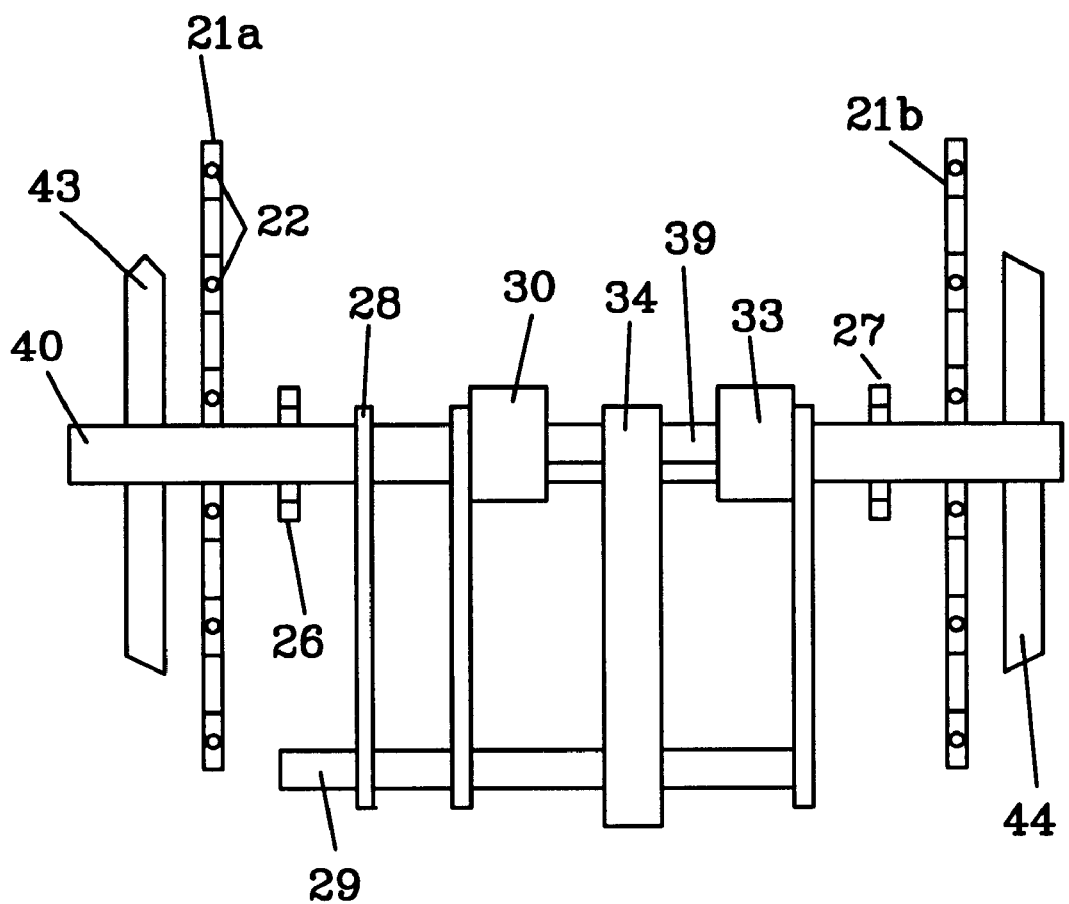
FIG. 5 is a partial top view of the orientation mechanism.

FIG. 4 is a partial view of the orientation mechanism. Component tube 40 is shown in a raised position by lifters 26 and 27 so that component tube 40 is in contact with rollers 30 and 33. Index tab 28a of index arm 28 is shown in contact with component tube 40, but has not moved into slot 40a. Rollers 30 and 33 are rotated by belt 34, on rollers 35 and 36. Roller 36 is mounted on shaft 29 which is turned by motor 52 FIG. 2). There are two slide rails 43 and 44 along which component tube slides as it is moved by conveyor chains 21a and 21b (FIG. 5). As illustrated in FIG. 4, component tube is raised above slides 43 and 44, but component tube 40 rests on slides 43 and 44 when lifters lowers component tube 40. When component tube 40 is rotated so that index tab 28a falls into slot 40a, then motor 52 stops the rotation of rollers 30 and 33, and component tube 40 is lowered onto rails 43 and 44 and conveyor chains 21a and 21b.

FIG. 5 is a top view of the partial view of FIG. 4. Component tube 40 is shown raised on lifters 26 and 27 into contact with rollers 30 and 33 which are turned by belt 34 and shaft 29. Conveyor chains 21a and 21b are shown below component tube 40, and component tube is shown positioned, when in the lowered position, between two pins 22. Slide rails 43 and 44 are shown outside of conveyor chains 21a and 21b, but may be placed inside the conveyor chain positions.

Figure 6:
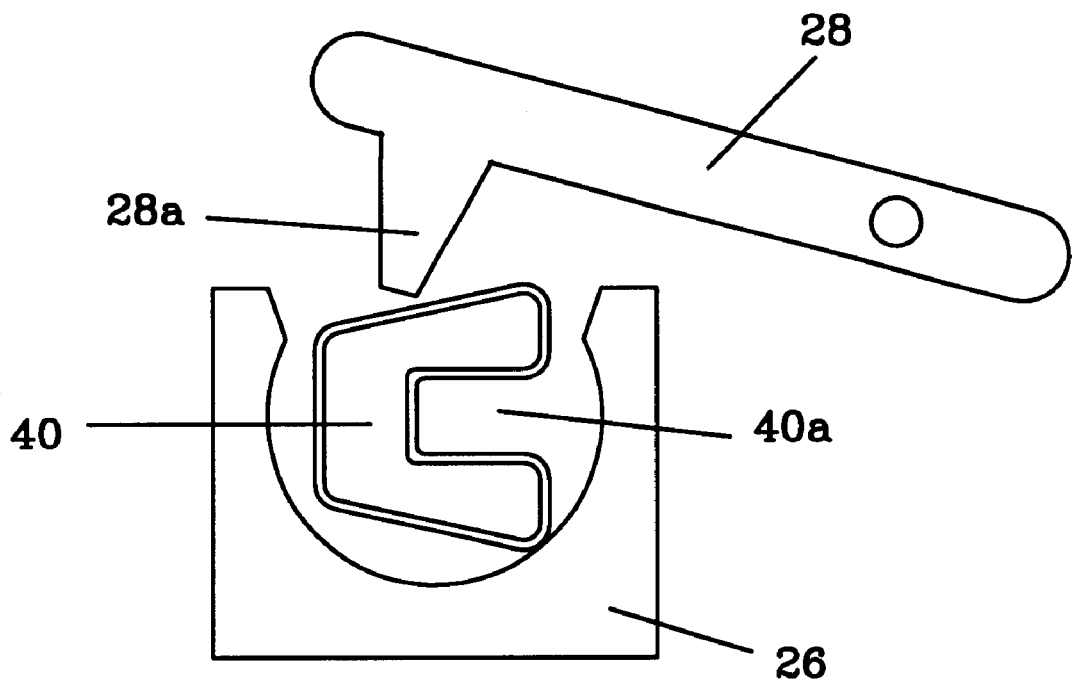
FIGS. 6 and 7 show the basic orientation process.
Figure 7:
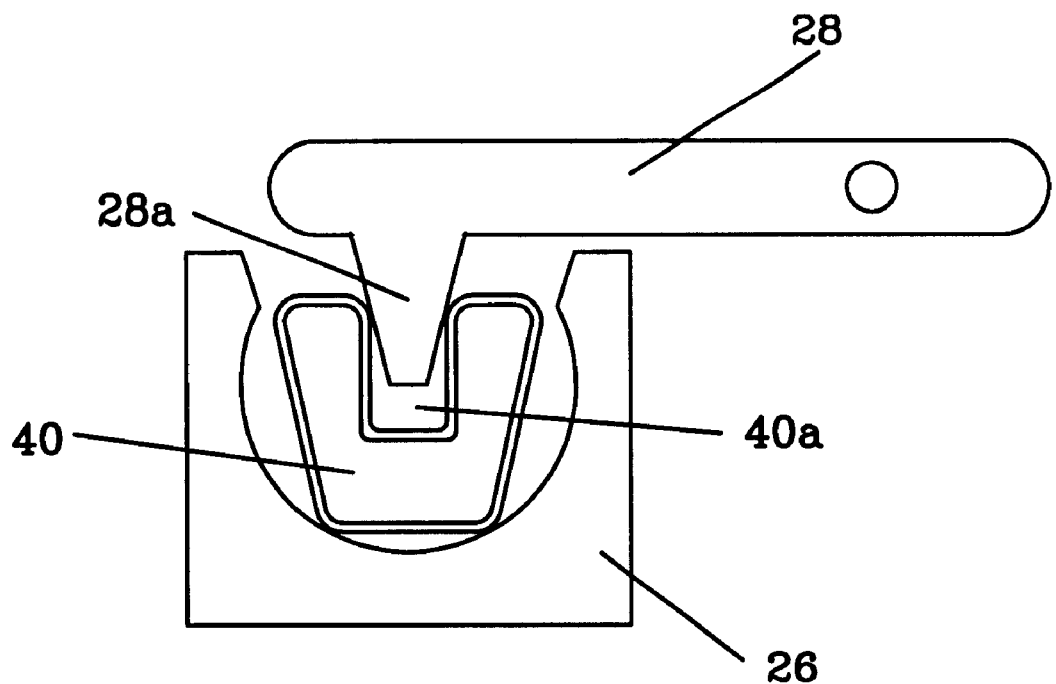

FIGS. 5 and 6 show the operation of index arm 29 and index tab 28a to position component tube in a predetermined position. When component tube is raised by lifters 26 and 27 (only lifter 26 is shown) component tube 40 will come into contact with index tab 28a (FIG. 6). Component tube 40 is then rotated until slot 40a is open upward, and index tab 28a will fall into slot 40a (FIG. 7) preventing component tube 40 from rotating.

With reference to the FIGS. 2–7, the operation of the tube orientation apparatus is as follows. A plurality of component tubes are placed into chamber 51 of dispensing apparatus 50. Singulators 58 and 59 ensure that only one component tube is dispensed at a time. A component tube is released by singulator 59 when sensor 60 determines that there is no component tube on conveyor chains 21a and 21b. Singulator 58 then release a tube to singulator 59. After a component tube has been dispensed onto conveyor chains 21a and 21b, the chains are indexed one position, moving the component tube along slides 43 and 44 one position. Lifters 26 and 27 lift component tube 40 upward and into contact with rollers 30 and 33, and index tab 28a. If a component tube has been lifted as determined by sensor 29a, then motor 52 turns rollers 30 and 33, rotating component tube 40 at least one complete revolution before stopping allowing index tab 28a to stop the rotation of component tube 40. When rotation is stopped then lifters 26 and 27 are lowered placing component tube onto slides 43 and 44, and conveyor chains 21a and 21b between to pins 22. Component tube 40 is then moved to the end of conveyor chains 21a and 21b to be removed for the filling or removing of components.

What is claimed is:

1. A semiconductor component tube orientation apparatus, comprising:

at least one motorized conveyor chain having spaced apart separators for holding a component tube;

a dispensing chamber for placing a component tube onto the conveyor chain;

a roller for rotating said component tube;

a index pin for stopping rotation of said component tube; and a elevator station for lifting the component tube from the conveyor chain into contact with said roller and index pin.

2. The apparatus according to claim 1, including a pair of rails along which the conveyor chain moves the component tube.

3. The apparatus according to claim 1, including a first sensor for determining when the dispensing chamber has placed a component tube on the conveyor chain.

4. The apparatus according to claims 1, including a second sensor for determining when a component tube has been lifted by the elevator station.

5. The apparatus according to claim 1, wherein said dispensing chamber has at least one singulator for preventing more than one component tube from being dispensed at a time.

6. The apparatus according to claim 1, wherein said dispensing chamber has at least one agitator for moving the component tubes toward a dispensing channel.

7. A semiconductor component tube orientation apparatus, comprising:

a motorized conveyor chain having spaced apart separators for holding a component tube;

a dispensing chamber for placing a component tube onto the conveyor chain;

a pair or rails along which the conveyor chain moves the component tube;

a roller for rotating said component tube;

a index pin for stopping rotation of said component tube; and a elevator station for lifting the component tube from the conveyor chain into contact with said roller and index pin.

8. The apparatus according to claim 7, including a pair of rails along which the conveyor chain moves the component tube.

9. The apparatus according to claim 7, including a first sensor for determining when the dispensing chamber has placed a component tube on the conveyor chains.

10. The apparatus according to claim 7, including a second sensor for determining when a component tube has been lifted by the elevator station.

11. The apparatus according to claim 7, wherein said dispensing chamber has at least one singulator for preventing more than one component tube from being dispensed at a time.

12. The apparatus according to claim 7, wherein said dispensing chamber has at least one agitator for moving the component tubes toward a dispensing channel.

* * * * *